(12) United States Patent
Griffiths et al.

(10) Patent No.: US 7,458,886 B1
(45) Date of Patent: Dec. 2, 2008

(54) NECK WASHER

(76) Inventors: Terry Cemlyn Griffiths, 2762 Elberton Rd., Carlton, GA (US) 30627; Larry Paul Griffiths, 122 David Ave., Collinsville, IL (US) 62234; Duane Dutton, 429 S. Fairway Dr., Pueblo West, CO (US) 81007; Greg Bilyeu, 20850 Irving Rd., Chanute, KS (US) 66720

( * ) Notice: Subject to any disclaimer, the term of this patent is extended or adjusted under 35 U.S.C. 154(b) by 0 days.

(21) Appl. No.: 12/137,675

(22) Filed: Jun. 12, 2008

(51) Int. Cl.
*A22B 7/00* (2006.01)
(52) U.S. Cl. ..................................... 452/173
(58) Field of Classification Search ............... 15/256.5, 15/3.1, 3.13, 3.16–3.18, 302, 320, 53.1–53.4, 15/906; 452/173, 177–184, 81, 114, 120, 452/123
See application file for complete search history.

(56) References Cited

U.S. PATENT DOCUMENTS

| | | | | |
|---|---|---|---|---|
| 1,837,610 A * | 12/1931 | Elias | ........................... | 15/3.17 |
| 2,719,993 A * | 10/1955 | Salkin | ........................ | 15/3.17 |
| 2,830,311 A * | 4/1958 | Vizdos | ........................ | 15/53.3 |
| 3,431,580 A * | 3/1969 | Cirino et al. | ................... | 15/302 |
| 3,793,663 A * | 2/1974 | Lieffring | ..................... | 15/53.3 |
| 3,806,978 A * | 4/1974 | Takeuchi | ..................... | 15/53.3 |
| 3,877,107 A * | 4/1975 | Cirino | ......................... | 15/302 |
| 4,760,620 A * | 8/1988 | Lamore | ....................... | 15/181 |
| 4,872,238 A * | 10/1989 | Crotts et al. | ................... | 15/302 |
| 5,167,044 A * | 12/1992 | Belanger et al. | ................. | 15/4 |
| 5,367,736 A * | 11/1994 | Kaady et al. | ................. | 15/53.3 |
| 5,806,137 A * | 9/1998 | Ishi et al. | ....................... | 15/302 |
| 6,145,146 A * | 11/2000 | Decker | ....................... | 15/53.2 |

\* cited by examiner

*Primary Examiner*—Thomas Price
(74) *Attorney, Agent, or Firm*—Ronald E. Smith; Smith & Hopen, P.A.

(57) ABSTRACT

An apparatus for washing the neck area of an animal carcass includes a pair of upwardly inclined brushes sharing a common angle of inclination, followed by a first pair of vertically disposed brushes, a second pair of vertically disposed brushes, and by a pair of downwardly inclined brushes sharing a common angle of inclination. The brushes of each pair of brushes are transversely spaced apart from one another to accommodate an animal carcass between them. First and second fluid headers are positioned in parallel relation to each inclined brush. A neck area of a carcass is initially cleaned by the pair of upwardly inclined brushes and associated fluid headers. The neck area then passes between the first and second pair of vertical brushes and associated fluid headers. The final cleaning is administered by the pair of downwardly inclined brushes and their associated fluid headers.

29 Claims, 6 Drawing Sheets

NECK WASHER

BACKGROUND OF THE INVENTION

1. Field of the Invention

This invention relates, generally, to methods for cleaning animal carcasses. More particularly, it relates to apparatus and methods for cleaning the neck area of an animal carcass.

2. Description of the Prior Art

The federal Food and Drug Administration (FDA) banned the use of brushes in animal carcass cleaning plants for many years because the brushes could become contaminated by one product and therefore other products moving through a cleaning station could become cross-contaminated. The present inventors discovered that the original contamination was possible because multiple bristles, each of which has a substantially circular transverse cross-section, were collectively bundled for mounting in circular blind bores formed in brush heads, enabling bacteria to thrive in the interstitial spaces between the bristles. The present inventors solved the contamination problem by reducing the size of each blind bore and mounting a single bristle in each blind bore, thereby eliminating the interstitial spaces and eliminating the bacterial breeding ground. The FDA then lifted the ban and rotating brushes are now allowed to be used in carcass cleaning procedures.

During the ban, carcass cleaning companies relied on oscillating high pressure water jets to perform the cleaning. With the advent of the bacteria-free brushes, most of these companies simply added the new, improved brushes to their cleaning stations without giving much thought as to the proper placement of the brushes, the optimal orientation of the brushes, the length of the individual bristles that collectively form a brush, how the water spray pattern should be adjusted to work with brushes, and so on.

Cleaning the neck area of a carcass is problematic. The known methods include spraying the neck area with high pressure water, usually with nozzles that oscillate back and forth.

Attempts have been made to improve the cleaning action of the water by increasing its pressure. However, the extra pressure can inhibit the oscillation of the nozzles so what is gained in pressure is lost in coverage.

Cleaning with water alone, or brushes alone, however, does not guarantee a clean product. The placement of the brushes, their direction of rotation, the length of their bristles, how the brushes are used in conjunction with spray nozzles, and so on cooperate to produce a clean product.

Thus there is a need for a neck cleaning method and apparatus that uses both brushes and water sprays in an optimal way.

More particularly, there is a need for methods that teach an optimal placement and orientation of brushes and water sprays relative to one another.

There is a need as well for an apparatus that incorporates brushes having bristles that perform more effectively than conventional bristles.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for an improved neck cleaning method and apparatus is now met by a new, useful, and non-obvious invention.

The inventive structure in its basic form is a novel assembly of rotatably-mounted brushes and fluid headers having nozzles along their respective extents for cleaning the neck area of a carcass.

The novel assembly of brushes and fluid headers is housed in an elongate, straight structure having an entrance end and an exit end. The brushes are arranged into pairs of brushes and that are transversely spaced apart from one another by a distance sufficient to receive a split carcass therebetween.

The first pair of brushes includes two transversely spaced apart brushes that are upwardly inclined and rotate about an axis of rotation that is inclined at a predetermined angle, preferably about forty-five degrees (45°), relative to horizontal. The second pair of brushes is actually a group of four (4) brushes, including a first, leading pair of transversely spaced apart brushes that rotate about a vertical axis and a second, trailing pair of transversely spaced apart brushes that rotate about a vertical axis. The third pair of brushes includes two transversely spaced apart brushes that are downwardly inclined and rotate about an axis of rotation that is inclined at a predetermined angle, preferably about forty-five degrees (45°), relative to horizontal.

The pairs of upwardly inclined, vertical, and downwardly inclined brushes are in longitudinal alignment with one another, i.e., the first brush in each pair of brushes is in longitudinal alignment with the first brush of the other pairs and the second brush in each pair of brushes is in longitudinal alignment with the second brush of each other pair.

The carcass being cleaned is suspended on an overhead conveyor that transports the carcass into the assembly of brushes at the entrance end, carries it the extent of the housing where it is brushed and sprayed, and carries it out of the exit end of the housing for further treatment. The path of travel of the carcass is coincident with a longitudinal axis of symmetry of the housing.

There are two (2) elongate fluid headers associated with each inclined brush and one (1) elongate fluid header associated with each vertical brush. A plurality of water or other liquid fluid-emitting nozzles is formed along the extent of each fluid header.

For each inclined brush, a first fluid header is mounted parallel to the axis of rotation of the brush and its nozzles are aimed toward the carcass, just barely missing the radially outermost end of the bristles or appendages. The water therefore impacts against the neck and flows downwardly over the neck under the influence of gravity and under the action of the brushes. A second fluid header is also mounted parallel to the axis of rotation of the brush and is positioned in the same vertical plane as the first fluid header, but the second fluid header is positioned radially closer to the brush. Its nozzles are aimed radially inwardly of the respective distal ends of the bristles or appendages so that the water emitted by the nozzles flows from radially inwardly of the radially outermost end of the bristles towards the radially outermost ends thereof.

The nozzles in the lower fluid header are aimed at the brushes as they complete their downward rotation so that the water from the lower fluid header is dedicated to brush cleaning.

The neck area is the lower forty inches (40") or so of the carcass. The neck area is first brushed by the first pair of transversely spaced apart brushes that is upwardly inclined at about a forty five degree (45°) angle. These upwardly inclined brushes are positioned near the entrance end of the assembly of brushes. The leading and trailing pair of vertical brushes follows the upwardly inclined brushes and provides a horizontal attack angle on the most critical area of the neck. The first, leading and second, trailing pairs of vertical brushes are positioned mid-length of the assembly. The vertical brushes are followed by the pair of transversely spaced apart brushes that is downwardly inclined at about a forty five degree (45°) angle. The pair of downwardly inclined brushes is positioned near the exit end of the assembly.

The pair of upwardly inclined brushes counter-rotate in a downward direction, as does the pair of downwardly inclined brushes. The middle set of vertical brushes includes the leading pair of transversely opposed brushes that counter-rotate in a direction towards the entrance end of the housing and the trailing pair of transversely opposed brushes that counter-rotate in a direction towards the exit end of the housing.

The vertical fluid headers associated with the vertical brushes are aimed at the brushes in cleaning relation thereto and not at the carcass.

Each nozzle of each fluid header produces a flat, fan-shaped spray that enables the water or other liquid fluid to be aimed at its intended target to minimize wastage of said water or other liquid fluid.

Each brush has short, medium length, and long bristles, also known as appendages, to enhance the cleaning power of the brush.

An important object of this invention is to thoroughly clean the neck area of carcasses with a combination of water or other liquid fluid under pressure and mechanical brushing.

A closely related object is to accomplish the foregoing object while using a minimum amount of water or other liquid fluid.

A more specific object is to disclose the optimum arrangement of brushes and fluid headers in a neck washing apparatus.

Still another object is to advance the art of brushes by disclosing bristles having greater cleaning power than the bristles of known brushes.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
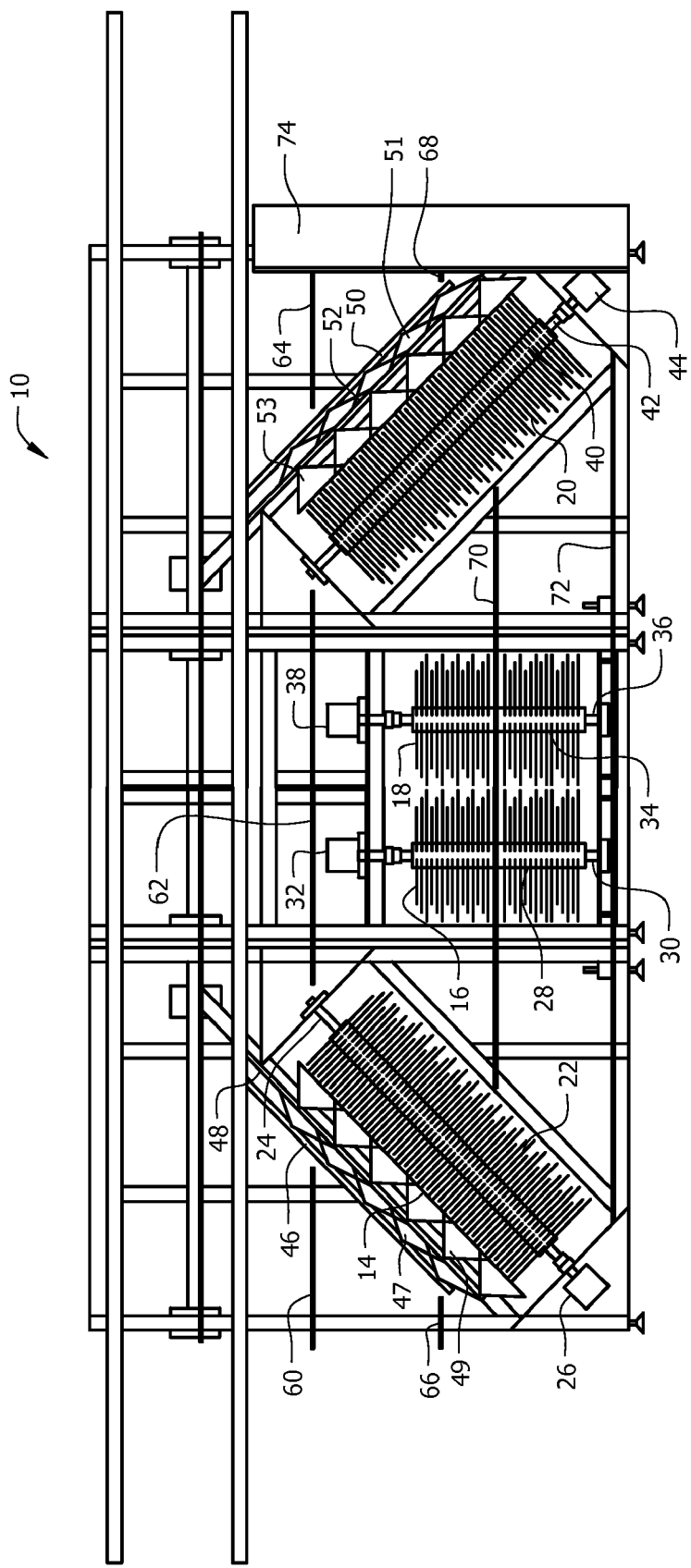
FIG. 1 is a front elevational view of the novel neck washer assembly with the brushes depicted in diagrammatic form.
Figure 2:
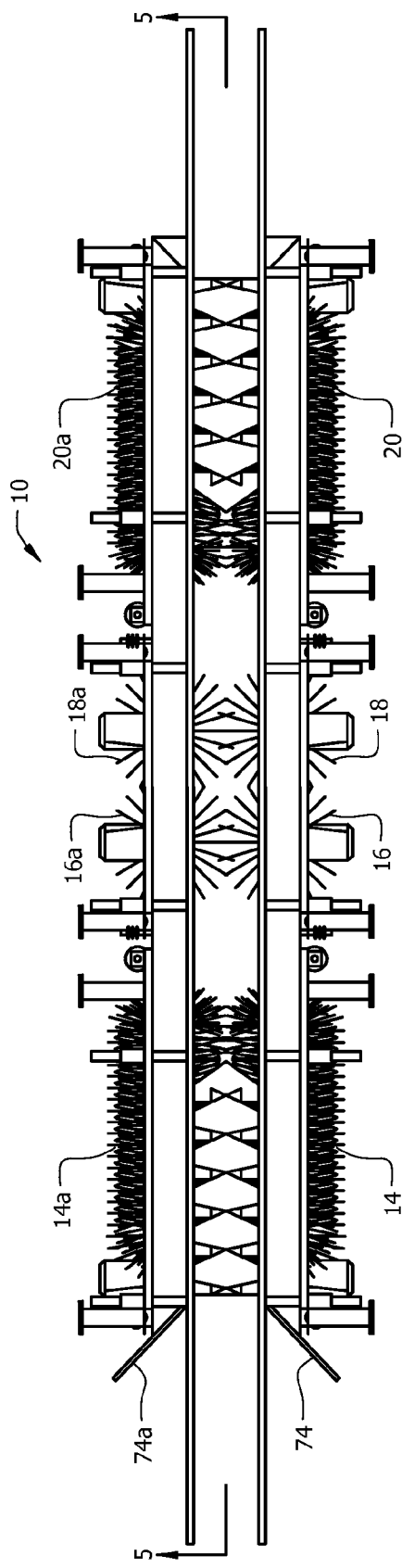
FIG. 2 is a top plan view of the novel neck washer assembly.

Referring now to FIGS. 1 and 2, it will there be seen that an illustrative embodiment of the invention is denoted as a whole by the reference numeral 10.

Neck washer assembly, in this first embodiment, includes eight (8) brushes, four (4) of which are visible in the front view of FIG. 1 and all eight (8) of which are visible in the top plan view of FIG. 2.

More particularly, a pair of upwardly inclined brushes is denoted 14, 14*a*, a first or leading pair of vertical brushes is denoted 16, 16*a*, a second or trailing pair of vertical brushes is denoted 18, 18*a*, and a pair of downwardly inclined brushes is denoted 20, 20*a*.

The brushes of each pair of brushes are transversely spaced from one another by a distance sufficient for a carcass neck to pass therebetween. More particularly, a carcass having a neck to be washed is suspended from an overhead conveyance and follows a path of travel between the paired brushes, traveling from left-to-right in the configuration as drawn.

Brush 14 rotates in a counterclockwise direction and brush 14*a* rotates in a clockwise direction in the assembly as drawn. This downwardly-directed counter-rotation causes the individual bristles of the brushes to travel from the back of a carcass neck towards the front thereof as the carcass enters the assembly at the left or entrance end thereof and travels toward the exit end of the assembly. The contaminants on a carcass neck are therefore brushed off the neck in a generally forward and downwardly direction by upwardly inclined brushes 14, 14*a*, beginning at a lower end of the neck and ending at an upper end thereof.

Each bristle of brush 14 is an appendage that is mounted to a core 22 and core 22 is keyed to an elongate shaft 24 that is rotated by a motor and gearbox, collectively denoted 26. Elongate shaft 24 is inclined upwardly at a forty five degree (45°) angle. Upwardly inclined brush 14*a* has the same structure. Although a separate motor is dedicated to each shaft in this illustrative embodiment, both shafts could be rotated by a single motor having a couple of power-take-off belts or the like. Therefore, the term "motor means" includes at least one motor and does not require two motors.

Each bristle of leading vertical brush 16 is an appendage that is mounted to a core 28 that is keyed to vertical shaft 30 that is rotated by a motor and gearbox that are collectively denoted 32. Leading vertical brush 16*a* has the same structure.

Each bristle of trailing vertical brush 18 is an appendage that is mounted to a core 34 that is keyed to vertical shaft 36 that is rotated by a motor and gearbox that are collectively denoted 38. Trailing vertical brush 18*a* has the same structure.

Vertical shafts 30 and 36 are disposed in parallel relation to one another. Motors 32 and 38 are connected in driving relation to vertical shafts 30 and 36 so that brushes 16 and 18 rotate at a common number of revolutions per minute (rpm) but in opposite directions. The same structure and rotation applies to brushes 16*a*, 18*a*.

Each bristle of downwardly inclined brush 20 is an appendage that is mounted to a core 40 and core 40 is keyed to an elongate shaft 42 that is rotated by a motor and gearbox, collectively denoted 44. Elongate shaft 44 is inclined downwardly at a forty five degree (45°) angle. Downwardly inclined brush 20*a* has the same structure.

After a carcass neck has traveled between and been brushed by upwardly inclined brushes 14 and 14*a*, it passes between the leading set of vertical brushes 16, 16*a*. Said leading set of brushes counter-rotate with respect to one another in a direction that opposes the path of travel of the carcass neck. Thus, contaminants are brushed toward the entrance end of assembly 10. The carcass neck then passes between the trailing set of vertical brushes 18, 18*a*. Said trailing set of brushes counter-rotate with respect to one another in a direction that follows the path of travel of the carcass. Thus, contaminants are brushed toward the exit end of the housing.

The carcass then travels between downwardly inclined brushes 20, 20a that counter-rotate with respect to one another and brush contaminates in a downwardly direction.

It will be observed in FIG. 1 that the bristles or appendages of the brushes are provided in three (3) differing lengths, i.e., long, medium-length, and short. These bristles of differing lengths are provided for all of the brushes, including the upwardly inclined brushes, the vertical brushes, and the downwardly inclined brushes. It has been determined that the cleaning efficiency of a brush is reduced if all of its bristles have a common length. The cleaning efficiency improves if half the bristles are long and half are short and still further efficiency is provided if one-third of the bristles are long, one-third short, and one-third of medium length roughly halfway between the lengths of the long and short bristles.

There are two (2) fluid headers associated with each upwardly inclined brush 14, 14a, and each downwardly inclined brush 20, 20a. There is one (1) fluid header associated with each vertical brush 16, 16a, 18, 18a. Each fluid header is parallel to the axis of rotation of its associated brush. The fluid headers associated with the upwardly and downwardly inclined brushes are mounted in a common longitudinally-extending vertical plane so that an outer fluid header is directly above an inner fluid header. The fluid headers associated with the vertical brushes are mounted adjacent thereto.

Each fluid header includes a plurality of equidistantly spaced apart nozzles along its length. In a preferred embodiment, each nozzle forms a flat, fan-shaped spray.

The nozzles in each outer fluid header are aimed to impact the product, barely missing the outermost ends of the rotating bristles of the brushes so that the water or other liquid fluid from the outer fluid headers is dedicated to washing the product. The nozzles in each inner fluid header are aimed at the bristles or appendages so that the water or other liquid fluid from the inner fluid headers is dedicated to brush cleaning and so that the liquid fluid is applied to the brushes at the optimal moment.

In FIG. 1, the outer fluid header for upwardly inclined brush 14 is denoted 46 and the inner fluid header for said brush is denoted 48. The flat, fan-shaped spray of water emanating from the nozzles of outer fluid header 46 is denoted 47 and just barely misses the radially outermost ends of the bristles of said brush 14 and impacts upon the carcass neck. The flat, fan-shaped spray of water emanating from the nozzles of inner fluid header 48 is denoted 49 and impacts the bristles of brush 14, thereby cleaning said bristles.

Fluid headers 46a, 48a operate in the same way for brush 14a.

The outer fluid header for downwardly inclined brush 20 is denoted 50 and the inner fluid header for said brush is denoted 52. The flat, fan-shaped spray of water or other liquid fluid emanating from the nozzles of outer fluid header 50 is denoted 51 and just barely misses the radially outermost ends of the bristles of said brush 18 and impacts the carcass neck. The flat, fan-shaped spray of water or other liquid fluid emanating from the nozzles of inner fluid header 52 is denoted 53 and impacts the bristles of said brush 20, thereby cleaning said bristles.

Fluid headers 50a, 52a operate in the same way for brush 18a.

The fluid headers associated with vertical brushes 16, 16a, 18, and 18a are aimed to clean their associated brushes and are not aimed at the carcass. One of the fluid headers is depicted in FIG. 5 and is denoted by the reference numeral 5.

Figure 5:
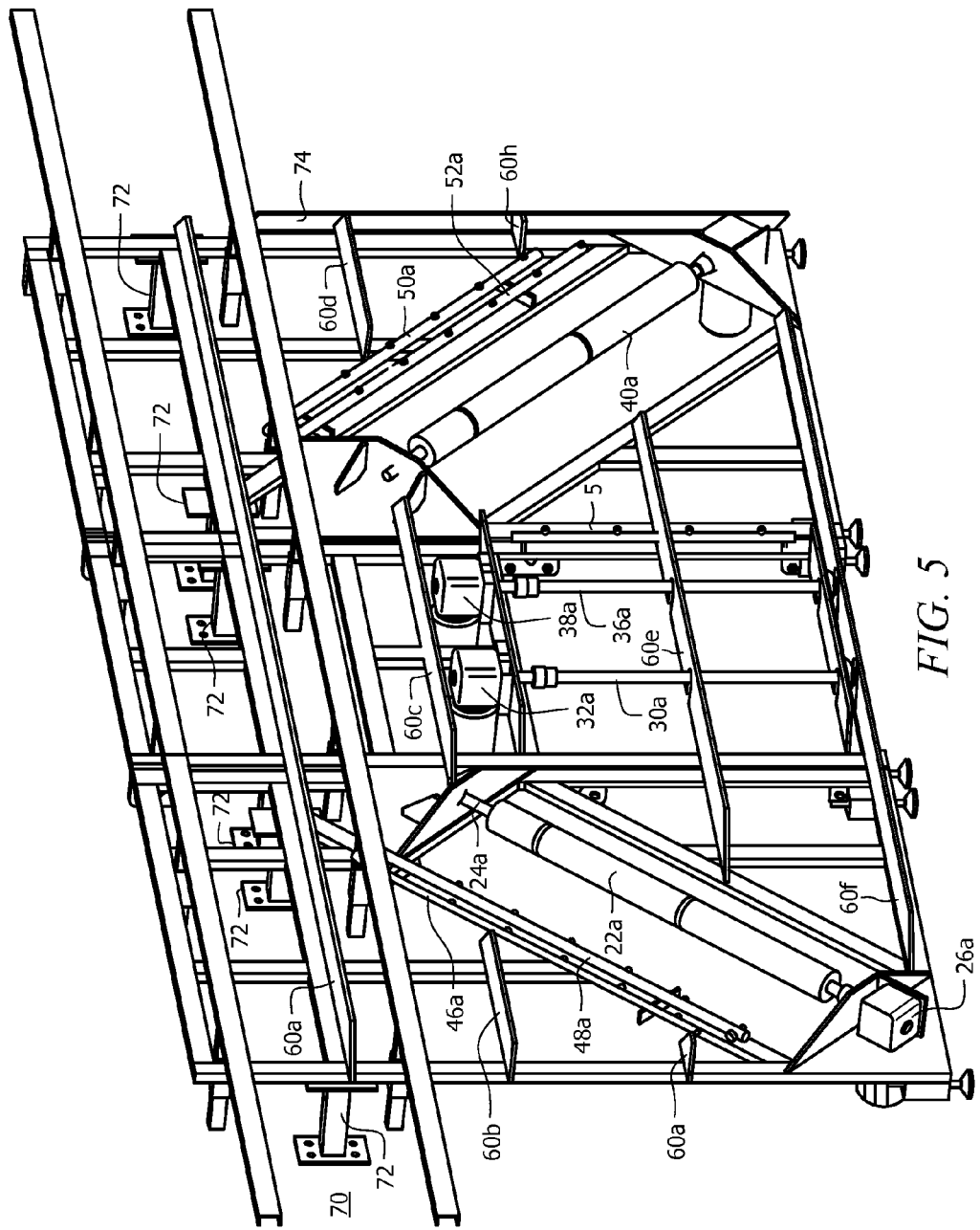
FIG. 5 is a perspective view of one-half the novel neck washer assembly, i.e., a perspective view taken along line 5-5 in FIG. 2.
Figure 6:
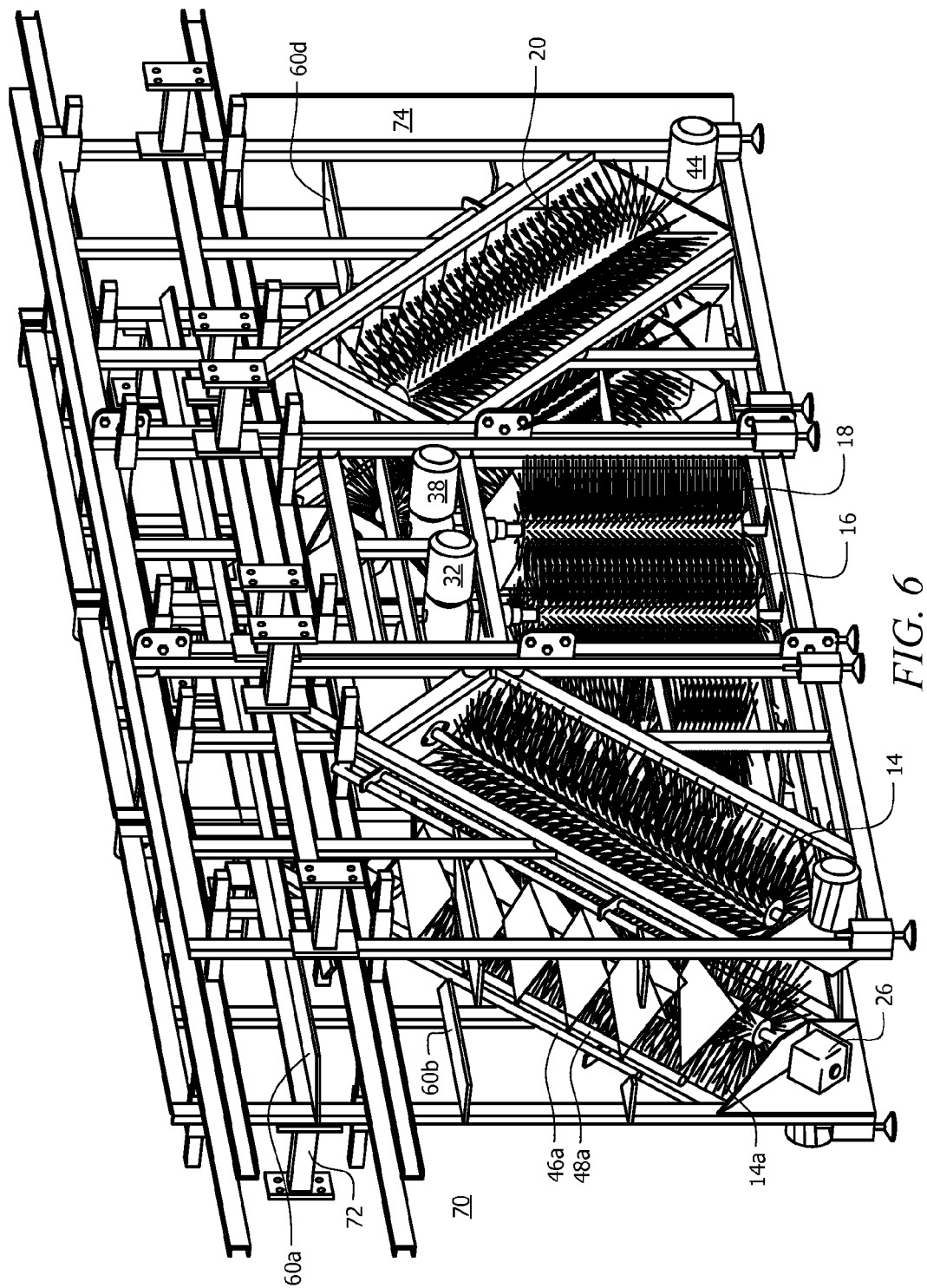
FIG. 6 is a perspective view of the novel neck washer.

As perhaps best depicted in FIG. 5, a plurality of horizontally-disposed static guides, denoted 60a-h is provided to keep the carcass traveling through machine 10 a safe distance from each brush. Each static guide is a solid stainless steel plate, about three-eighths of an inch (3/8") in thickness. Each static guide has the appearance of a shelf; each is mounted to an upstanding framework of the novel machine and extends perpendicularly from said framework toward the center or longitudinal axis of symmetry of the machine. Static guides 60a-h eliminate "trap" or "pinch" points that might impede the progress of the carcass though the machine.

In FIG. 5, top static guide 60a extends horizontally substantially the entire extent of the housing. Three (3) static guides are mounted below top static guide 60a at about the same height as the upper end of the upwardly and downwardly inclined brushes. Leading static guide 60b is positioned in leading relation to the first upwardly inclined brushes, middle static guide 60c is positioned between the upwardly and downwardly inclined brushes, and trailing static guide 60d is positioned in trailing relation to the downwardly inclined brushes. A mid-level static guide 60e extends between the upwardly and downwardly inclined brushes, and a low-level static guide 60f is near the bottom of the assembly and between said upwardly and downwardly-inclined brushes. Two (2) very truncate static guides 60g and 60h are positioned at the leading and trailing ends of the housing at a height slightly above that of mid-level static guide 60e.

Each static guide 60 has a counterpart on the opposing half of the structure that is not depicted in FIG. 5. The brushes are not depicted in FIG. 5 to better reveal the various parts of the novel housing. Note that the leading edge of each static guide is beveled, i.e., swept back so that a carcass abutting a static guide does not get stuck or impeded by the static guide. The trailing edge of each static guide is not beveled.

Novel housing 10 is secured in spaced apart relation to an upstanding wall 70. A plurality of stand off assemblies, collectively denoted 72, have a flat base plate secured to vertical wall 70, a similar plate secured to the framework of housing 10, and a horizontally disposed stand-off member therebetween. Said three (3) individual parts of said stand-off assemblies 72 are easily seen in FIG. 5 and are not separately numbered to avoid cluttering of the drawings.

Figure 3:
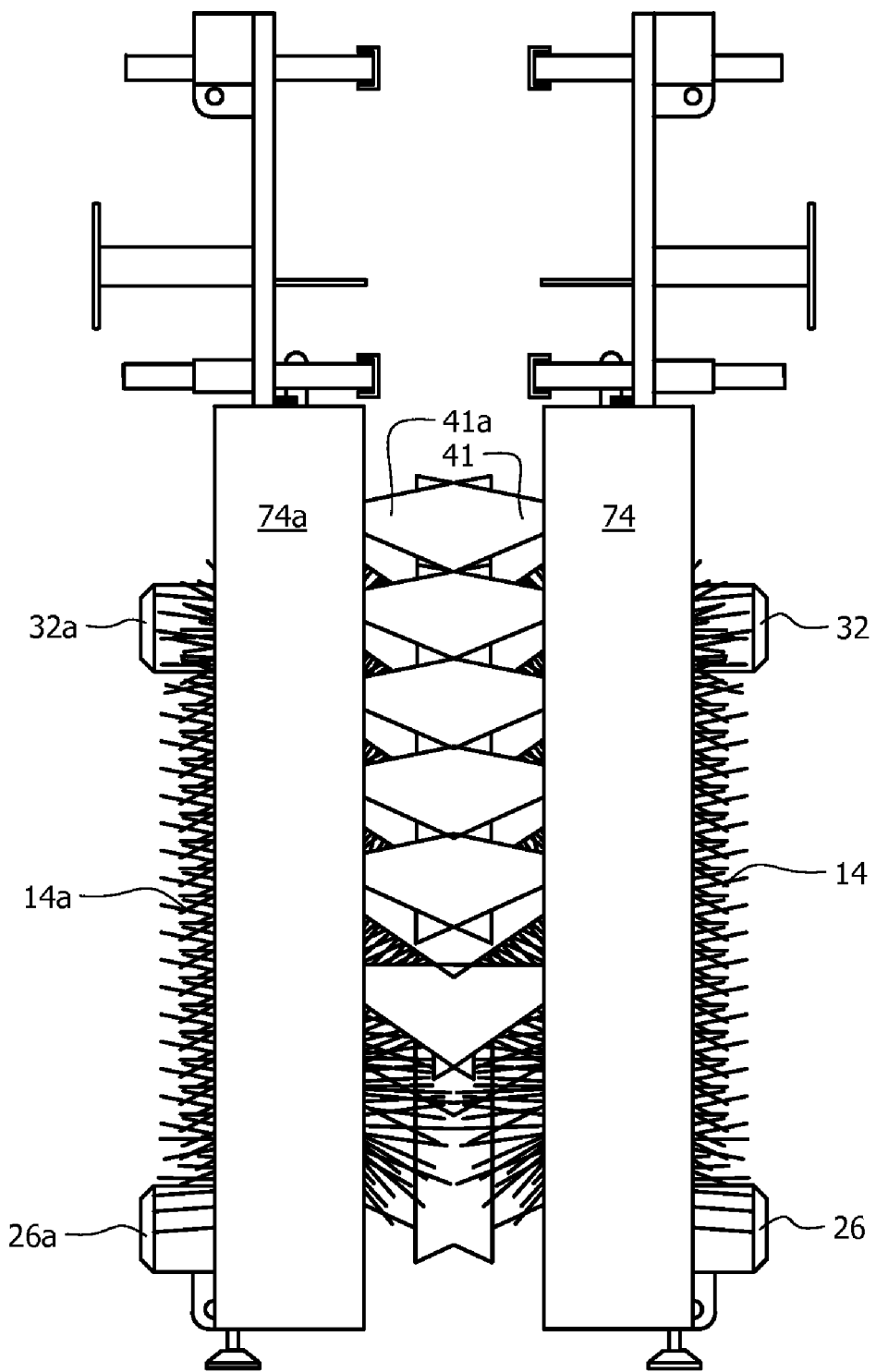
FIG. 3 is a first, entrance end elevational view of the neck washer.
Figure 4:
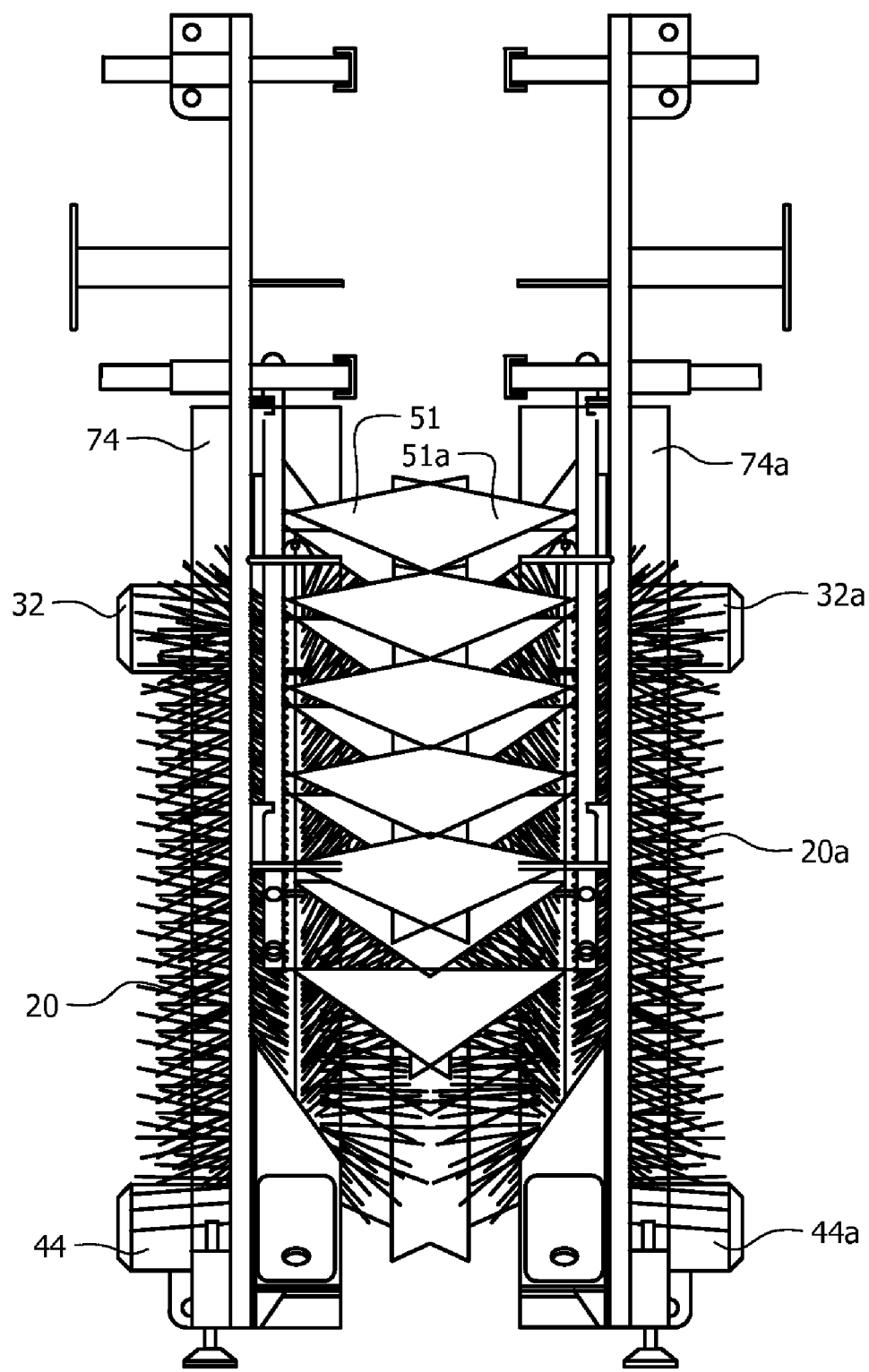
FIG. 4 is a second, exit end elevational view thereof.

The entrance end view of FIG. 3 depicts the transverse spacing between brushes 14, 14a, said spacing being the same for all of the other transversely-spaced sets of brushes as well. This is the space through which the carcasses travel from left-to-right as drawn in FIG. 1.

Deflection plates 74, 74a at the entrance end of the apparatus steer the carcass towards the center of the apparatus, as perhaps best depicted in FIGS. 2 and 3.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An apparatus for washing the neck area of an animal carcass, comprising:

a pair of longitudinally disposed, parallel, upwardly inclined, elongate brushes sharing a common angle of inclination and being transversely spaced apart from one another by a distance sufficient to accommodate an animal carcass therebetween;

a first motor means for rotating said upwardly inclined brushes about respective axes of rotation in counter-rotating relation to one another;

a first pair of vertically disposed brushes disposed in transversely spaced apart relation to one another by a distance sufficient to accommodate an animal carcass therebetween;

a second motor means for rotating said first pair of vertically disposed brushes about respective axes of rotation in counter-rotating relation to one another;

a second pair of vertically disposed brushes disposed in transversely spaced apart relation to one another by a distance sufficient to accommodate an animal carcass therebetween, said second pair of vertically disposed brushes being disposed in longitudinal alignment with said first pair of vertically disposed brushes;

a third motor means for rotating said second pair of vertically disposed brushes about respective axes of rotation in counter-rotating relation to one another;

a pair of longitudinally disposed, parallel, downwardly inclined, elongate brushes sharing a common angle of inclination and being transversely spaced apart from one another by a distance sufficient to accommodate an animal carcass therebetween;

a fourth motor means for rotating said pair of downwardly inclined brushes about respective axes of rotation in counter-rotating relation to one another;

whereby a neck area of a carcass is cleaned in sequence by said pair of upwardly inclined brushes, said first pair of vertical brushes, said second pair of vertical brushes, and said pair of downwardly inclined brushes.

2. The apparatus of claim 1, further comprising:

a first and second fluid header positioned in substantially parallel relation to a first brush of said pair of upwardly inclined brushes;

said first fluid header adapted to spray a liquid fluid on said carcass;

said second fluid header adapted to spray a liquid fluid on said first brush of said pair of upwardly inclined brushes.

3. The apparatus of claim 2, further comprising:

said first fluid header including a first plurality of nozzles along its extent;

said second fluid header including a second plurality of nozzles along its extent;

said first plurality of nozzles adapted to spray a liquid fluid onto said carcass, said first plurality of nozzles being aimed so that substantially all liquid fluid emitted by said first plurality of nozzles impinges upon said carcass and not upon said first upwardly inclined brush;

said second plurality of nozzles adapted to spray a liquid fluid onto said first upwardly inclined elongate brush.

4. The apparatus of claim 3, further comprising:

each nozzle of said first and second plurality of nozzles forming a flat, fan-shaped pattern of liquid fluid.

5. The apparatus of claim 1, further comprising:

a first and second fluid header positioned in substantially parallel relation to a second brush of said pair of upwardly inclined brushes;

said first fluid header adapted to spray a liquid fluid on said carcass;

said second fluid header adapted to spray a liquid fluid on said second brush of said pair of upwardly inclined brushes.

6. The apparatus of claim 5, further comprising:

said first fluid header including a first plurality of nozzles along its extent;

said second fluid header including a second plurality of nozzles along its extent;

said first plurality of nozzles adapted to spray a liquid fluid onto said carcass, said first plurality of nozzles being aimed so that substantially all liquid fluid emitted by said first plurality of nozzles impinges upon said carcass and not upon said second upwardly inclined brush;

said second plurality of nozzles adapted to spray a liquid fluid onto said second upwardly inclined elongate brush.

7. The apparatus of claim 6, further comprising:

each nozzle of said first and second plurality of nozzles forming a flat, fan-shaped pattern of liquid fluid.

8. The apparatus of claim 1, further comprising:

a first fluid header positioned in substantially parallel relation to a first brush of said first pair of vertically disposed brushes;

said first fluid header adapted to spray a liquid fluid on said first brush of said first pair of vertically disposed brushes.

9. The apparatus of claim 8, further comprising:

said first fluid header including a first plurality of nozzles along its extent;

said first plurality of nozzles adapted to spray a liquid fluid onto said first brush of said first pair of vertically disposed brushes.

10. The apparatus of claim 9, further comprising:

each nozzle of said first plurality of nozzles forming a flat, fan-shaped pattern of liquid fluid.

11. The apparatus of claim 1, further comprising:

a first fluid header positioned in substantially parallel relation to a second brush of said first pair of vertically disposed brushes;

said second fluid header adapted to spray a liquid fluid on said second brush of said first pair of vertically disposed brushes.

12. The apparatus of claim 11, further comprising:

said second fluid header including a first plurality of nozzles along its extent;

said first plurality of nozzles adapted to spray a liquid fluid onto said second brush of said first pair of vertically disposed brushes.

13. The apparatus of claim 12, further comprising:

each nozzle of said first plurality of nozzles forming a flat, fan-shaped pattern of liquid fluid.

14. The apparatus of claim 12, further comprising:

each nozzle of said first and second plurality of nozzles forming a flat, fan-shaped pattern of liquid fluid.

15. The apparatus of claim 1, further comprising:

a first fluid header positioned in substantially parallel relation to a first brush of said second pair of vertically disposed brushes;

said second fluid header adapted to spray a liquid fluid on said first brush of said second pair of vertically disposed brushes.

16. The apparatus of claim 15, further comprising:
said first fluid header including a first plurality of nozzles along its extent;
said second fluid header including a second plurality of nozzles along its extent;
said first plurality of nozzles adapted to spray a liquid fluid onto said carcass, said first plurality of nozzles being aimed so that substantially all liquid fluid emitted by said first plurality of nozzles impinges upon said carcass and not upon said first brush of said second pair of vertically disposed brushes;
said second plurality of nozzles adapted to spray a liquid fluid onto said first brush of said second pair of vertically disposed brushes.

17. The apparatus of claim 16, further comprising:
each nozzle of said first and second plurality of nozzles forming a flat, fan-shaped pattern of liquid fluid.

18. The apparatus of claim 1, further comprising:
a first fluid header positioned in substantially parallel relation to a second brush of said second pair of vertically disposed brushes;
said second fluid header adapted to spray a liquid fluid on said second brush of said second pair of vertically disposed brushes.

19. The apparatus of claim 18, further comprising:
said first fluid header including a first plurality of nozzles along its extent;
said first plurality of nozzles adapted to spray a liquid fluid onto said second brush of said second pair of vertically disposed brushes.

20. The apparatus of claim 19, further comprising:
each nozzle of said first and second plurality of nozzles forming a flat, fan-shaped pattern of liquid fluid.

21. The apparatus of claim 1, further comprising:
a first and second fluid header positioned in substantially parallel relation to a first brush of said pair of downwardly inclined brushes;
said first fluid header adapted to spray a liquid fluid on said carcass;
said second fluid header adapted to spray a liquid fluid on said first brush of said pair of downwardly inclined brushes.

22. The apparatus of claim 21, further comprising:
said first fluid header including a first plurality of nozzles along its extent;
said second fluid header including a second plurality of nozzles along its extent;
said first plurality of nozzles adapted to spray a liquid fluid onto said carcass, said first plurality of nozzles being aimed so that substantially all liquid fluid emitted by said first plurality of nozzles impinges upon said carcass and not upon said first downwardly inclined brush;
said second plurality of nozzles adapted to spray a liquid fluid onto said first downwardly inclined brush.

23. The apparatus of claim 22, further comprising:
each nozzle of said first and second plurality of nozzles forming a flat, fan-shaped pattern of liquid fluid.

24. The apparatus of claim 1, further comprising:
a first and second fluid header positioned in substantially parallel relation to a second brush of said pair of downwardly inclined brushes;
said first fluid header adapted to spray a liquid fluid on said carcass;
said second fluid header adapted to spray a liquid fluid on said second brush of said pair of downwardly inclined brushes.

25. The apparatus of claim 24, further comprising:
said first fluid header including a first plurality of nozzles along its extent;
said second fluid header including a second plurality of nozzles along its extent;
said first plurality of nozzles adapted to spray a liquid fluid onto said carcass, said first plurality of nozzles being aimed so that substantially all liquid fluid emitted by said first plurality of nozzles impinges upon said carcass and not upon said second downwardly inclined brush;
said second plurality of nozzles adapted to spray a liquid fluid onto said second downwardly inclined brush.

26. The apparatus of claim 1, further comprising:
at least one brush of said first and second upwardly inclined brushes, first and second pairs of vertically disposed brushes, and first and second downwardly inclined brushes including a plurality of radially disposed appendages of differing lengths.

27. The apparatus of claim 26, further comprising:
said plurality of radially disposed appendages of differing lengths including a plurality of short appendages, a plurality of long appendages, and a plurality of appendages having a length substantially midway between said short and long appendages.

28. A method of washing the neck area of a carcass, comprising the steps of:
positioning a first pair of longitudinally disposed, parallel, upwardly inclined, elongate brushes sharing a common angle of inclination in transversely spaced apart relation to one another;
positioning a first pair of vertically disposed shafts in transversely spaced apart relation to one another and in longitudinal alignment with said first pair of upwardly inclined brushes;
positioning a second pair of vertically disposed brushes in transversely spaced apart relation to one another and in longitudinal alignment with said first pair of vertically disposed brushes; and
positioning a first pair of longitudinally disposed, parallel, downwardly inclined, elongate brushes sharing a common angle of inclination in transversely spaced apart to one another and in longitudinal alignment with said second pair of vertically disposed brushes.

29. The method of claim 28, further comprising:
positioning a first and a second fluid header in substantially parallel relation to a first brush of said pair of upwardly inclined brushes;
positioning a first and a second fluid header in substantially parallel relation to a second brush of said pair of upwardly inclined brushes;
positioning a first fluid header in substantially parallel relation to a first brush of said first pair of vertically disposed brushes;
positioning a first fluid header in substantially parallel relation to a second brush of said first pair of vertically disposed brushes;
positioning a first and a second fluid header in substantially parallel relation to a first brush of said second pair of vertically disposed brushes;
positioning a first fluid header in substantially parallel relation to a second brush of said second pair of vertically disposed brushes;
positioning a first and second fluid header in substantially parallel relation to a first brush of said pair of downwardly inclined brushes;

positioning a first and a second fluid header in substantially parallel relation to a second brush of said pair of downwardly inclined brushes; and cleaning a neck area of a carcass in sequence by sequentially transporting said carcass between said pair of upwardly inclined brushes, said first pair of vertical brushes, said second pair of vertical brushes, and said pair of downwardly inclined brushes while rotating all of said brushes and discharging liquid fluid from said fluid headers.

* * * * *